2,705,230

METHOD OF PURIFYING ALBUMIN

Allen F. Reid, Dallas, Tex.

No Drawing. Application September 23, 1949,
Serial No. 117,499

1 Claim. (Cl. 260—122)

This invention relates to the purification of albumin and more particularly to the removal of protein contaminants in an albumin solution.

Purification of albumin is presently carried out by fractional precipitation of the proteins other than albumin by salting out, or by use of organic solvents at low temperatures or by salt removal causing precipitation of the less soluble globulins.

It is an object of this invention to provide a method of removal of contaminating proteins from albumin by heating.

It is another object of this invention to purify albumin by denaturing contaminating proteins by heating.

It is a further object of this invention to preserve albumin in solution while removing contaminating proteins by heating and denaturing.

It is a still further object of this invention to remove contaminating proteins from albumin by changing the iso-electric point of the contaminating proteins.

In the purification of albumin it is necessary to remove other proteins which are found combined with albumin in nature. This removal has previously been effected by fractional precipitation of the contaminating proteins. According to this invention chemical agents which make the albumin heat-resistant are added to the albumin solution, the pH of the solution is adjusted, the solution is heated, the contaminating proteins are denatured and precipitated, the pH of the solution is again adjusted and more of the contaminating proteins are precipitated, and finally by mechanical separation the precipitated denatured proteins are removed from the albumin solution. The heat preserving chemicals are removed from the final albumin solution by ion exchange with anion and cation exchange resins and also by dialysis, or by a combination of these methods.

In the preservation of the albumin in the heating step of this invention, non-polar anions with comparatively long molecules provide the best protection. The whole class of non-polar anions with molecular weights greater than 80 provide heat-resisting ability. Caprate, oleate and caprylate salts are good examples of compounds having anions which provide these heat-resisting properties. The addition of any of these salts to an albumin solution enables the solution to be heated to a temperature where the contaminating proteins are denatured and precipitated in part and made susceptible to precipitation in part. After mechanical removal of the denatured and precipitated proteins the non-polar heat-resisting anion and its accompanying cation may be removed from the albumin by ion exchange with ion exchange resins. The resultant product is a purified albumin relatively free from other contaminating proteins.

In this invention the variation of the solubility of proteins with the variation of the pH of the solution is employed in bringing about the fractional precipitation which removes the contaminating proteins from the albumin. Soluble proteins become less and less soluble as they approach their iso-electric point in solution. Soluble proteins are held in solution by charges on the large protein molecules. These charges become more positive with a low pH and more negative with a high pH. These high positive and negative charges act to maintain the protein molecules in solution. However, when the solution is essentially neutral at an intermediate pH, herein referred to as the iso-electric point, the effect of these solution-sustaining charges is at a minimum and the soluble protein is least soluble. Each of the protein species has a characteristic intermediate pH or iso-electric point. When the contaminating proteins are denatured some of the proteins are precipitated because of agglomeration, other proteins are precipitated because of reaction of the groups which support the negative and positive charges, and others because the iso-electric point of the protein has been shifted by the heating to a value approximating the pH of the solution. Any or all of these effects may occur to cause precipitation of the proteins. In addition, the contaminating proteins in the albumin solution have their iso-electric points changed so as to simplify precipitation by adjustment of the pH of the solution.

In the application of the above process of the purification of albumin, but not limiting in any way the scope of the process in its description, the following examples are set forth:

Example I

Solid sodium caprylate was added to some bovine serum until the concentration of sodium caprylate was 0.05 molar. The pH was then adjusted to 8 with sodium hydroxide. The temperature was raised to 64° C. and held there for 30 minutes. The serum was then cooled to room temperature. Hydrochloric acid was added to bring the pH to 5.6. The proteins which precipitated in the treatment were centrifuged off leaving an albumin solution. A mixture of one part of Amberlite XE-68, a cation exchange resin of the sulfonic acid type, and three parts of Amberlite IRA-400, an anion exchange resin of high basicity, which had been conditioned to distilled water, was then placed with the serum until the concentration of sodium was 1.4% of the concentration of the albumin and the solution was approximately neutral. This albumin, after concentration of the solution to 20% albumin, was suitable for serological Rh tests.

Example II

Human serum albumin was prepared from human serum by desalting the serum using a mixture of anion and cation exchange resins. The globulins which precipitated were centrifuged off but the albumin remaining contained a small amount of water-soluble globulins and possibly other protein contaminants. Sodium caprylate was added to the solution to a concentration of .02 molar, the temperature was raised to 64° C. and held there for 30 minutes denaturing the contaminating proteins. The denatured proteins were then centrifuged off from the albumin and the albumin was treated with a mixture of one part of Amberlite IR-100, a cation exchange resin of phenol-formaldehyde sulfonic acid type, and two parts Deacidite, an anion exchange resin of aliphatic amine type, which had been conditioned to pyrogen-free water. This treatment was carried on until the sodium caprylate was quantitatively removed. The resultant albumin when concentrated was satisfactory for therapeutic uses.

Example III

A solution of .2 molar sodium caprate was added to an equal quantity of a solution of human serum albumin containing contaminating globulins. The resulting solution was heated to 70° C. and held at that temperature for 20 minutes. At the end of that time the solution was cooled, the pH was brought to 5.6 with hydrochloric acid, and the proteins which precipitated were centrifuged off leaving the albumin solution free of contaminating globulins. The excess sodium caprate and salts found in the original albumin solution were removed with a mixture of one part of Amberlite IR-100 to three parts of Amberlite IRA-400 leaving a satisfactorily pure albumin solution.

Example IV

A solution of .2 molar sodium oleate was added to an equal quantity of a solution of human serum albumin containing contaminating globulins. The resulting solution was heated to 70° C. and held at that temperature for 20 minutes. At the end of that time the solution was cooled, the pH was brought to 5.6 with hydrochloric acid and the proteins which precipitated were centrifuged off leaving the albumin solution free of contaminating globulins. The excess sodium oleate and salts found in the original albumin solution were removed with a mixture of one part of Amberlite IR-100 to three parts of Amberlite IRA-400 leaving a satisfactorily pure albumin solution.

Example V

Solid sodium caprylate was added to some bovine serum until the concentration of sodium caprylate was 0.5 molar. The pH was then adjusted to 8 with sodium hydroxide. The temperature was raised to 64° C. and held there for 30 minutes. The serum was then cooled to room temperature. Hydrochloric acid was added to bring the pH to 5.6. The proteins which precipitated in the treatment were centrifuged off leaving an albumin solution. Undesired sodium caprylate was removed by dialysis.

In general, the higher the temperature of the denaturation, the faster and more complete is the change in the contaminating proteins. Correspondingly, the greater the concentration of the protecting heat-resisting chemical, the higher the temperature may be taken without affecting the albumin. Thus, the concentration of the heat-resisting protective chemical and the denaturation temperature governs the rate and completeness of the purifying operation. On the other hand, the greater the concentration of the protective chemical added, the more of that chemical must be removed from the purified albumin. This leads to a more expensive purification and greater losses of albumin.

In addition to caprylate, oleate and caprate salts as stabilizers for the albumin during the heating operation, other high molecular weight salts may be used. These other salts include sodium heptylate, sodium caproate, sodium laurate, sodium valerate, sodium acetylphenylalaninate, sodium acetyleucinate and sodium acetyltryptophanate. However, these will not in all cases effectively protect or stabilize the albumin in heating the solution to denature all of the contaminating proteins but a certain amount of protection effective for allowing the denaturation of some of the contaminations is provided. Likewise, the heat treatment is also not limited to 64° C. for 30 minutes; 10 hours at 62° C. is also very effective, or 10 minutes at 68° C. is practical in some applications. The concentration of the chemical added is not critical; it may be varied from 0.02 to 0.15 molar—the actual choice depending on the temperature of denaturation chosen and the work required to remove the chemical after denaturation. The pH adjustment depends somewhat on the nature of contaminating proteins and can be chosen to suit the iso-electric points of the particular denatured proteins present.

In the selection of ion exchangers used to remove the heat-resisting chemical, care should be taken to keep the pH of the solution within the limits of the stability of the albumin. In addition to the ion exchange resins mentioned in the examples, other ion exchange resins may be employed to remove the ions of the heat-resisting agent so long as the stability of the albumin is preserved.

Moreover, it is not necessary to employ the resins in a mixture but the solution may be treated with first one of the ion exchanges and then the other, again keeping the pH within the limits of stability of the albumin.

Albumin is of considerable importance, particularly in the medical fields. Human serum albumin is used therapeutically to increase the osmotic pressure of the blood as in the case of burns and conditions of shock. It is also used diagnostically to determine the blood volume of an individual. Animal serum albumin is used as a tool in the laboratory to separate different types of blood cells. It is also used as a diluent in certain serological tests such as Rh antibody tests in both routine and research applications. Lactalbumin (albumin from milk) has a number of research applications, and, were it available in larger quantities, pure, it might have a number of useful applications. In all of these cases there are present in the original solutions other protein constituents which must be removed quantitatively to get a satisfactory product. Among other advantages, this invention removed the contaminating proteins easily and without effect upon the albumin. The albumin thus purified is suitable for medical use and has a wide application.

It will be apparent that the invention is not limited to the modifications set forth herein and is limited only by the appended claim in which I claim:

A process of removing contaminating proteins from a blood serum albumin solution comprising the steps of mixing with said albumin solution a heat-resisting agent having non-polar anions with a molecular weight greater than 80 and less than 380 and of the group consisting of caprylate, oleate and caprate salts which make the albumin heat-resistant when added to the solution, heating said resultant mixture to a temperature above the point of denaturation of said contaminating proteins and below the point of denaturation of said albumin, precipitating said denatured proteins from said mixture and removing said precipitated proteins from said mixture and removing said heat-resisting agent by means of ion exchange resins.

References Cited in the file of this patent

UNITED STATES PATENTS

| Number | Name | Date |
|---|---|---|
| 911,269 | Reuter | Feb. 2, 1909 |
| 2,461,505 | Daniel | Feb. 15, 1949 |
| 2,468,730 | Block et al. | May 3, 1949 |

OTHER REFERENCES

Cohn, "Memorandum on the Preparation of Normal Human Serum Albumin" (pub. July 18, 1947, as PB-77276), pp. 3, 12 and 13.

Mann, "Chemistry of the Proteids" (MacMillan, London; 1906), pp. 363 and 364.

Ballou et al., J. Clin. Invest., vol. 23, pp. 454-7 (1944).